United States Patent [19]

Jacobson

[11] 4,094,248

[45] June 13, 1978

[54] HIGH PACKING DENSITY PROPELLANT GRAINS

[75] Inventor: Sidney S. Jacobson, Chester, N.J.

[73] Assignee: The United States of America as represented by Secretary of the Army, Washington, D.C.

[21] Appl. No.: 789,598

[22] Filed: Apr. 21, 1977

[51] Int. Cl.² ............................................. F02K 9/02
[52] U.S. Cl. ..................................................... 102/100
[58] Field of Search .................................. 102/99–103

[56] References Cited

U.S. PATENT DOCUMENTS 3,429,264  2/1969  Oversohl et al. .................... 102/100

FOREIGN PATENT DOCUMENTS 1,595,508  6/1970  France ................................ 102/103
7,178 of  1897  United Kingdom ................. 102/99

Primary Examiner—Verlin R. Pendegrass
Attorney, Agent, or Firm—Nathan Edelberg; A. Victor Erkkila; Max Yarmovsky

[57] ABSTRACT

A propellant charge is assembled by stacking together a plurality of extruded longitudinally grooved polygonally shaped high packing density propellant grains. An hexagonal configuration provides for nearly full utilization of the circular volume of a propellant chamber. Selective location of a plurality of perforations and grooves through each grain member is used to provide propellant charge assemblies having uniform web distribution and improved burn characteristics.

4 Claims, 3 Drawing Figures

HIGH PACKING DENSITY PROPELLANT GRAINS

GOVERNMENTAL INTEREST

The invention described herein may be manufactured, used and licensed by or for the Government for governmental purposes without the payment to me of any royalty thereon.

BACKGROUND OF THE INVENTION

Various means have been used in the prior art to increase the density of the propellant charge beyond 0.8 gm/cc for large caliber weapons such as howitzer and cannon. The prior art propellant charges usually comprise randomly assembled multi-perforated, small length-to-diameter ratio grains. It is generally desirable to increase the bulk density of the propellant charge in order to achieve greater performance from the weapon. Since the propellant chamber frequently has a fixed volume, it is advantageous to use a high bulk density charge to obtain greater amounts of energy for the available space. Some prior art devices try to solve this problem by vibrating chopped, multiperforated, right-circular cylindrical propellant grains. It has been found that vibration reduces the amount of free volume (ullage) within the charge chamber, but not as efficiently as desirable because these grains after vibration, are still randomly oriented and have air spaces therebetween. Other prior art devices are bundled, right-circular grains diametral surfaces. Some prior art devices try solving the increased density problem by consolidating the charge by compacting and crushing the grains sometimes in the presence of a propellant solvent. The problem with the aforementioned consolidation process is that it produces a circular wafer having limited thickness or height.

The aforedescribed prior art devices, while each contributing somewhat to an increase in the bulk charge density, have never fully eliminated the ullage problem and consequently have not, in most instances, efficiently exploited the full available volume of a propellant chamber. Additional problems are frequently encountered when vibration and consolidation techniques are used. There is an element of risk always associated with these packing procedures. Because of accidental initiation it is never completely safe to vibrate or compress energetic materials such as must be used in propellant charges. One of the problems with the use of propellant grains made by the consolidation technique is that the ignition and burning of the charge is highly dependent upon the way that the compacted material breaks up under the shock of ignition.

SUMMARY OF THE INVENTION

The present invention relates to a propellant charge which uses a high packing density propellant grain which provides for very nearly full utilization of the volume of a cartridge, case, or weapon propellant chamber. The present grain design permits nearly full utilization of the volume of the propellant chamber without requiring the necessity of vibration or compaction after assembly. The present device permits passage of gases through the propellant charge so that the resultant ignition and thrust forces are substantially smooth and surge free.

An object of the present invention is to provide an hexagonally shaped perforated propellant grain structure which lends itself to high packing density.

Another object of the present invention is to provide a perforated hexagonally shaped propellant grain which minimizes ullage in a cartridge, case or weapon propellant chamber.

Another object of the present invention is to provide a perforated hexagonally shaped high packing density propellant grain which allows easy passage of gases generated during ignition to provide smooth, uniform, surge free thrust.

Another object of the present invention is to provide a perforated hexagonally shaped propellant grain structure which may be assembled or stacked together into a bundle to eliminate individual placement of grains in a propellant chamber.

Another object of the present invention is to provide a perforated high packing density propellant charge which has a constant web distance between perforations in its cross-sectional area.

A further object of the present invention is to provide a high packing density propellant grain which when assembled will maintain uniform web thickness during burning, and tend to produce more uniform slivering or burn-through of the web and thus smoother burning of the charge.

For a better understanding of the present invention, together with other and further objects thereof, reference is made to the following descriptions taken in connection with the accompanying drawings.

BRIEF DESCRIPTION OF THE DRAWINGS

Throughout the following description like reference numerals are use to denote like parts of the drawings.

DESCRIPTION OF THE PREFERRED EMBODIMENTS

Figure 3:
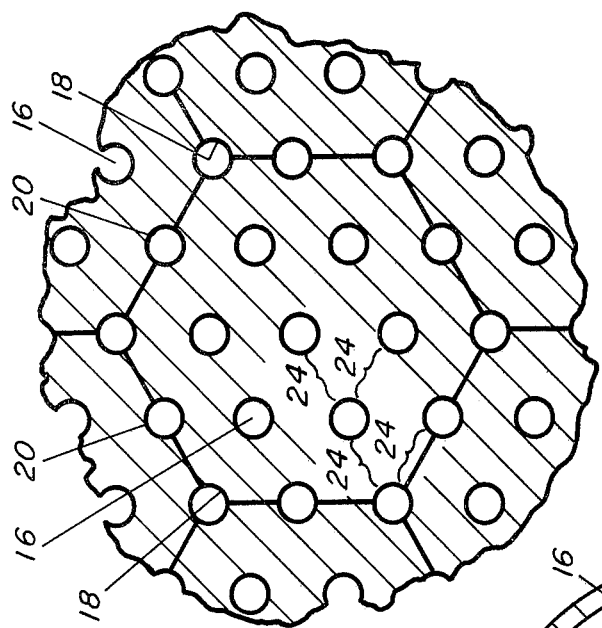
FIG. 3 is an enlarged view of a portion of the cross-sectional propellant grain bundle shown in FIG. 2.
Figure 2:
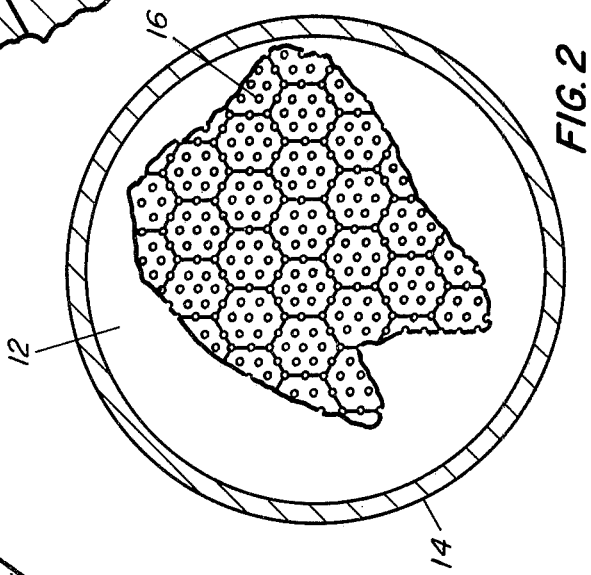
FIG. 2 is a partial cross-sectional view of a bundle of propellant grains stacked in a propellant chamber.
Figure 1:
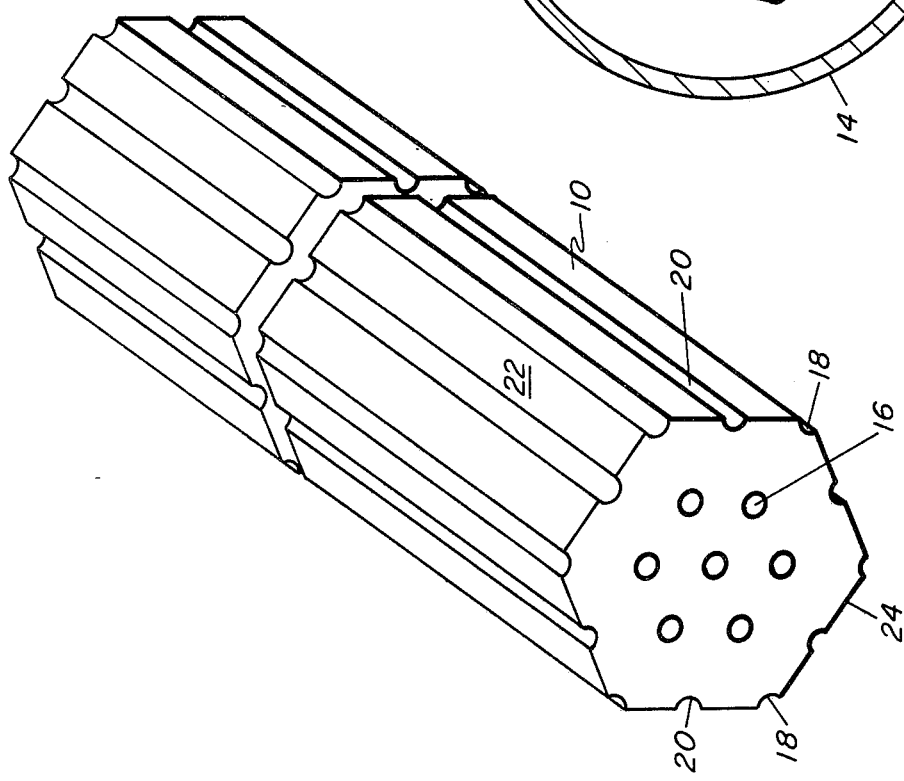
FIG. 1 is an isometric view of the hexagonally shaped propellant grain.

Referring now to FIGS. 1, 2 and 3, the propellant grain 10 shown in FIG. 1 is extruded in an hexagonal shape, stacked or bundled together, and then inserted into a propellant chamber 12 of projectile casing 14. A plurality of internal perforations 16 are centered on the vertices of equilateral triangles. The triangles may be formed by joining opposite vertices of the hexagon and by joining the mid-points of every other side of the hexagon cyclically in both clockwise and counter-clockwise directions. The vertices are constructed so that they are equidistant from each other. The six vertices of the hexagonally shaped grain 10 have longitudinally shaped grooves 18 disposed in the external surface of grain 10 in parallel alignment with internal grooves 16. The vertex grooves 18 have arc lengths of 120° arc of a circle and are equal to the radius of the internal perforations 16. In addition, a plurality of semi-circularly shaped longitudinal grooves 20, having an 180° arc length of a circle of radius equal to the radius of the internal perforations 16, is disposed along each face at the midpoint of each rectangularly shaped side 22 in parallel alignment with grooves 16 and 18.

In operation, because of the hexagonal contour of the grains 10, stacking or bundling of the grains 10 will fill the space of the propellant chamber 12 except for a small volume at the interior walls of the cartridge case or weapon propellant chamber 14. Because of the hexagonal shape of the propellant grain 10 stacking is exceptionally easy to accomplish, does not require individual placement of the grains, and lend itself to automated assembly. The grooves 18 and 20, on othe exterior of the grain 10, act as channels which allow transmission of ignition gas uniformly throughout the assembled charge. Because of the placement of the internal perforations 16 and the grooves 18 and 20 on the vertices of equilateral triangles, the web 24 of the grain 10 will be constant throughout the individual grains and across the boundaries of the individual adjacent grains. The web 24 thickness is maintained across grain boundaries by symmetrically positioned external grooves 16 and 18 in each grain. Uniform web thickness is critical to smooth burning of the propellant charge.

The foregoing disclosure and drawings are merely illustrative of the principles of this invention and are not to be interpreted in a limiting sense. I wish it to be understood that I do not desire to be limited to the exact details of construction shown and described for obvious modifications will occur to a person skilled in the art.

Having thus fully described the invention, what is claimed as new and desired to be secured by Letter Patent of the United States is:

1. A propellant charge which comprises:
   a plurality of extruded polygonally longitudinal shaped propellant grains, said grains having a plurality of equally spaced internal perforations longitudinally disposed therethrough, a plurality of longitudinally disposed external vertex grooves in parallel alignment with said internal perforations, and a plurality of semi-circular longitudinally disposed external grooves located at the midpoint of each polygonal side, said semi-circular grooves being in parallel alignment with said internal perforations and said external vertex grooves, said plurality of internal perforations vertex grooves, and said semi-circular grooves each being separated by a web of equal thickness.

2. A propellant charge as recited in claim 1 wherein said plurality of extruded polygonally longitudinal shaped propellant grains comprises a plurality of extruded hexagonally shaped propellant grains having a plurality of internal circular perforation being centered on the vertices of equilateral triangles formed by joining opposite vertices of a hexagon and by joining the midpoints of every other side of the hexagon cyclically in both clock wise and counter clockwise directions.

3. A propellant charge as recited in claim 2 wherein said plurality of extruded hexagonally shaped propellant grains comprises a plurality of longitudinally disposed external vertex grooves therein having 120° arc lengths of a circle equal to the radius of said internal perforations.

4. A propellant charge as recited in claim 2 wherein said plurality of extruded hexagonally shaped propellant grains comprises a plurality of semi-circular longitudinal disposed external grooves located at the midpoint of each hexagonal side, said semi-circular longitudinally disposed grooves having 180° arc lengths of a circle equal to the radius of said internal perforations.

* * * * *